United States Patent
Knapp et al.

[15] 3,694,082
[45] Sept. 26, 1972

[54] PHOTOGRAPHIC PRINTER

[72] Inventors: Walter Knapp; Kurt Ramsauer, both of Munich, Germany

[73] Assignee: Agfa-Gevaert Aktiengesellschaft, Leverkusen, Germany

[22] Filed: Dec. 28, 1970

[21] Appl. No.: 102,011

[30] Foreign Application Priority Data

Dec. 29, 1969 Germany..........P 19 65 244.9

[52] U.S. Cl.....................................355/97, 355/103
[51] Int. Cl. ............................................G03b 27/04
[58] Field of Search.........355/97, 83, 88, 103, 67, 68

[56] References Cited

UNITED STATES PATENTS 1,856,859  5/1932  Whitson et al...............355/83
3,168,860  2/1965  Clerk et al...................355/83

Primary Examiner—Samuel S. Matthews
Assistant Examiner—Richard L. Moses
Attorney—Michael S. Striker

[57] ABSTRACT

Printable negatives are provided with notches that are detected, the resulting "notch" signals being sent to a logic circuit that controls the movement of the film through the scanning and printing stations. A first "notch" signal from a scanning station stops the corresponding negative in the scanning station. The succeeding "notch" signal from a scanning station do not, the film being stopped by the "notch" signal from the printing station. If the negative has no notch, the omission of the "notch" signal from the scanning station prevents printing of the un-notched negative.

14 Claims, 2 Drawing Figures

INVENTOR
WALTER KNAPP
KURT RAMSAUER 3,694,082

PHOTOGRAPHIC PRINTER

BACKGROUND OF THE INVENTION

The invention relates to a photographic printer for printing film strips composed of a series of negatives and having marks related to the individual negatives that are printable, the printer including a film drive that is manually started and automatically stopped by the marks. A scanning station for setting any necessary corrections of the printing time for each negative is located in front of the printing station.

Prior-art printers of this kind incorporate a feeler arrangement for detecting the mark, which is in the form of a marginal notch positioned relative to each negative. If a feeler arrangement is provided only at the printing station, the first notched negative, after an unnotched length of the film strip, is advanced immediately to the printing station without previously stopping at the scanning station, thereby preventing visual examination of the negative and the setting of printing corrections. To avoid this disadvantage, there can be provided for the scanning station a feeler arrangement for detecting the marginal notches. The problem arises, however, as to which of these two feeler arrangements should stop the film drive. This problem is particularly acute when it is doubtful that a negative in the scanning station is to be printed and it cannot be determined by the eye whether or not the negative is notched.

SUMMARY OF THE INVENTION

An object of the invention is improvements in a photographic printer of the aforesaid kind, whereby printable negatives are stopped at the scanning station and then immediately advanced to the printing station.

The invention consists essentially of drive means for advancing the film strip, a scanning station for setting any necessary corrections of the printing time for each negative, a printing station positioned after the scanning station in the direction of advance of the film strip, a first detection means, associated with the scanning station, and a second detection means, associated with the printing station, for each delivering a signal each time that a mark on the film is detected to stop drive means, and a logic circuit, connected to the first and second detection means, for preventing the stopping of the drive means when the first detection means delivers a signal provided that the latter has previously delivered a signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
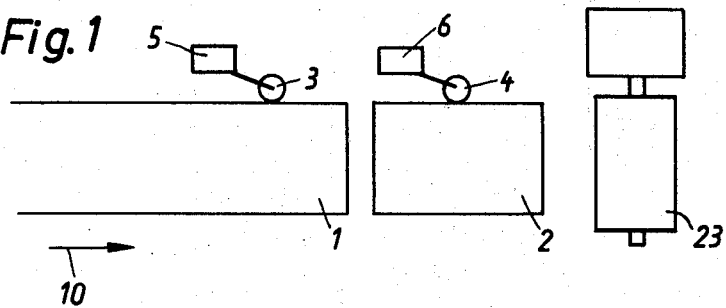
FIG. 1 schematically shows the arrangement of a printer incorporating the improvements of invention.

With reference to FIG. 1, the reference numeral 1 denotes an illuminated, elongated, scanning station, such as that described in U.S. Pat. application Ser. No. 76,069. Positioned after the scanning station 1 is a printing station 2, which uniformly exposes the negative to light the image in the negative being focussed by an objective onto light sensitive paper. The length of the printing time can be determined, in a known manner, by a photoelectrically operated switching arrangement, to which a light divider directs some of the light that has past through the negative that is being printed. Any necessary corrections of the printing time —such as those required by deviation from the reciprocity law— are provided by this photoelectrically operated switching arrangement, not shown.

The strip of film, containing a series of negatives, is moved past the two stations 1 and 2. Those negatives that are to be printed have associated therewith a rounded notch in the margin of the film. Feelers 3 and 4, respectively associated with the stations 1 and 2, engage these notches and control respective micro switches 5 and 6. Feeler 3 and switch 5 together form part of first detection means according to the invention, whereas feelers 4 and 6 form part of second detection means. The two feelers 3 and 4 are spaced, along the path of the film strip, a distance apart equal to the maximum length of a negative plus the maximum width of the space between two consecutive negatives. When a feeler 3 or 4 falls into a marginal notch, it delivers a signal to the logic circuit shown in FIG. 2. Those negatives that are not to be printed do not have a marginal notch.

An electric motor, not shown, connected to the film strip drive rollers 23 by an electromagnetic coupling 7, moves the film strip from the supply reel, not shown, past the stations 1 and 2 and to a take-up reel, not shown. An electromagnetic brake 8, rigid with the frame of the stations 1 and 2, stops the drive rollers 23 when the brake is energized. The flip-flop 9 permits alternate energization of the coupling 7 and the brake 8.

Figure 2:
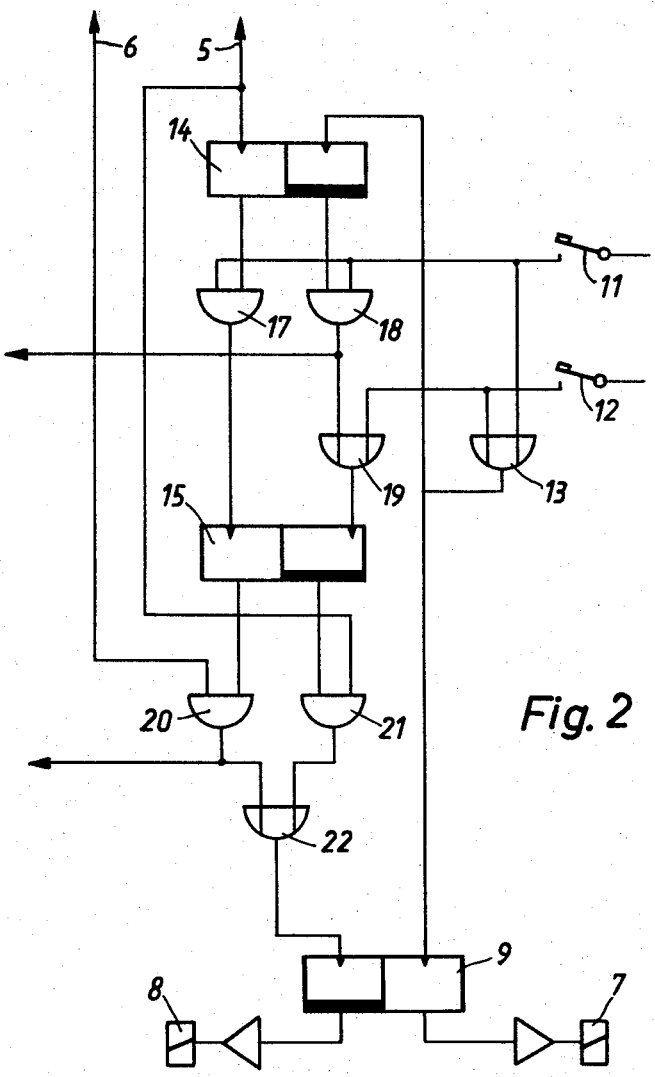
FIG. 2 shows the logic circuit of the invention.

With reference to FIG. 2, the logic circuit has four inputs. One input is connected by a lead to the micro switch 5, which latter provides a signal each time that its feeler 3 engages a marginal notch. Another input is connected to the micro switch 6, which latter also delivers a signal whenever its feeler engages a marginal notch at the printing station 2. The other two inputs are connected to the hand-operated normally open, spring loaded switches 11 and 12. The switch 11 can be, for example, coupled with and operated jointly with the density correction switch that is the last switch to be operated before a negative is printed. The other switch 12, which is a kind of start switch, is closed whenever a length of the film strip is not to be printed and the drive rollers 23 are to be stopped when the feeler 3 engages the next notch. The momentary closing of either switch 11 or 12 causes, through the OR gate 13, the flip-flop 9 to be triggered to that state in which the electromagnetic coupling 7 is energized.

In addition to the flip-flop 9, the logic circuit has a store flip-flop 14 and a flip-flop 15. One input of the store flip-flop 14 is connected to the micro switch 5, and the other input is connected to the output of the OR gate 13, so that closing either of the switches 11 and 12 triggers the flip-flop 14. The respective outputs of the flip-flop 14 are connected to the respective ones of the inputs of the AND gates 17 and 18, the other inputs of these AND gates being connected to the switch 11. As symbolized by the arrow, the output of the AND gate 18 delivers a signal to erase the stored printing correction. The output of the AND gate 18 is also connected by an OR gate 19 to one input of the flip-flop 15, the other input of the OR gate 19 being connected to the start switch 12. The other input of the flip-flop 15 is connected to the output of the AND gate 17. Respective inputs of the AND gates 20 and 21 are connected to the outputs of the flip-flop 15, the other inputs of these two AND gates being connected respectively to the micro switch 6 and to the micro switch 5. By means of an OR gate 22, the two AND gates 20 and 21 trigger the flip-flop 9 to that state in which the electromagnetic brake 8 is energized. The output of the AND gate 20 provides the signal for starting the printing of a negative. With a delay sufficient to bring the negative to rest at the printing station, this signal causes the correction values for the respective negative to influence the exposure control arrangement. In controlling the start of the printing, this signal can cause the opening of a shutter, for example.

The logic circuit just described operates in the following manner. The beginning of a film strip usually comprises a leader that contains no notched negatives. This leader is moved through the guide means, not shown, of the stations 1 and 2 until the drive rollers 23 grip it, whereupon the start switch 12 is closed. A signal from the OR gate 13 triggers the flip-flop 9 to that state in which the electromagnetic coupling 7 is energized. The film drive arrangement is in operation. At the same time, the flip-flop 14 is triggered so that a one signal is at one input of the AND gate 18. A signal from the OR gate 19 triggers the flip-flop 15, there resulting a one signal on one input of the AND gate 21. When the feeler 3 engages the marginal notch of the first printable negative, the micro switch 5 delivers a one signal to the second input of the AND gate 21 thereby, by way of the OR gate 22, triggering the flip-flop 9 to its other state, and, consequently, energizing the brake 8. The flip-flop 14 is simultaneously triggered by the signal from the micro switch 5, so that a one signal is at one input of the AND gate 17. The first printable negative is now in the scanning station 1. Any necessary corrections of the printing time are set at the scanning station. The corrections set are stored at the scanning station or at the printing station.

When the density correction switch is closed, switch 11 is closed concurrently (these switches being of course operated after the start switch 12); the OR gate delivers a signal that triggers the flip-flop 9 back to its original state; and the electromagnetic coupling 7 is energized to start movement of the film strip. Although the output from the OR gate 13 does trigger the flip-flop 14, there appears, before the triggering, a one signal at the second input of the AND gate 17, thereby triggering the flip-flop 15 and providing a one signal at the first input of the AND gate 201 when the printable negative, with its marginal notch, is advanced sufficiently far so that the feeler 4 engages this notch, the micro switch 6 delivers a signal to the second input of the AND gate 20, the OR gate 22 thereby delivering a signal to the flip-flop 9 and causing energization of the electromagnetic brake, so that the film advance is stopped. At the same time, the output of the AND gate 20 provides a signal for the beginning of the printing.

While the negative is being printed, the operator of the printer has time to set the corrections for the printing of the negative that is in the scanning station 1. When the switch 11 is again closed, the electromagnetic brake 8 is de-energized. If the printing of the negative is finished, the film is advanced immediately; if not, the film is advanced as soon as the printing is over. If the next negative is notched, the steps just described are repeated.

It is also possible, however, that a negative, because it is badly out of focus or very badly exposed, is not notched, without it being absolutely certain that the negative is not to be printed. Since the poor lighting at the scanning station and the small dimensions of the negatives make it impossible for the operator to see the notches, it can occur that the operator does not know whether this or that particular negative is to be printed. In this instance, the printing correction values for the negative are set, and the switch 11 is closed to release the brake 8. If the negative is notched, the steps, as described above, are repeated.

If the negative is not notched, the film strip is stopped when the feeler 4 engages the notch of the preceding negative. The feeler 3, however, does not engage a notch, because the negative in question has none. Consequently, since the micro switch 5 delivers no signal, the flip-flop 14 remains in that state in which a one signal is at one input of the AND gate 18. When the density correction switch 11 is closed, the second input of the AND gate 18 also has a one signal; and the flip-flop 15 is triggered to that state in which a one signal is at one input of the AND gate 21. If the following negative that arises at the scanning station 1 is notched, the micro switch 5 delivers a signal that is conducted by way of the AND gate 21 and the OR gate 22 to the flip-flop 9, triggering the latter to energize the electromagnetic brake 8. The film strip advance is stopped. Since the signal to stop the film advance is provided by the AND gate 21, there is no signal to begin the printing of the un-notched negative held at the printing station 2. The output of the AND gate 18 has caused erasure of the correction values for the un-notched negative, and the correction values for the notched negative, held at the scanning station 1, can be stored. When these values have been set, the switch 11 is closed, and the negative is advanced to the printing station 2.

If negatives of different sizes are to be printed, there can be provided as many feelers and micro switches in the scanning station 1 as there are different formats. That feeler and micro switch are connected to the logic circuit of FIG. 2 which correspond to the size of the negatives printed.

The invention is not limited to the embodiment just described. For example, the spacing between the two feelers 3 and 4 can be less than the length of the shortest negative. The flip-flop 15 is triggered only after the film strip has started to advance. In this case, there must be provided a circuit for measuring the time or length corresponding to approximately the length of one negative, in order to ensure that if there appears no signal from the micro switch 5, the latter will cause the film advance to stop when the feeler 3 does engage the next notch. If this precaution were not taken, the next printable negative would advance immediately to the printing station without having previously stopped at the scanning station.

The feelers 3 and 4 should be spaced apart a distance greater than one-half, and less than twice, the length of a negative.

A photographic printer incorporating the invention prints a negative only when the latter has a notch. If it is not known whether the negative in the scanning station is to be printed —in particular, if it is not known whether it has a notch— the negative is centered in the printing station and printed if the notch engaged by the scanning station feeler does not brake the film drive. The signal caused by the next notch is stored to ensure that the signal from the micro switch of the printing station will stop the film after the next film advance. If the negative in question has no notch, the film advance operates until the feeler at the scanning station detects the next notch. No printing is done, however. Any printing correction values for the un-notched negative are immediately erased.

It will be understood that each of the elements described above, or two or more together, may also find a useful application in other types of circuits differing from the types described above.

While the invention has been illustrated and described as embodied in improvements in a photographic printer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a photographic printer for printing film strips composed of a series of negatives and having marks related to the individual negatives that are printable, comprising, in combination a scanning station for setting of corrections which may be necessary in the printing time of a film strip negative; a printing station spaced in predetermined direction from said scanning station; drive means for advancing the film strip in said direction so that the negatives sequentially pass said scanning and printing stations; first detecting means associated with said scanning station for generating a first signal in response to detection of a mark on a negative located at said scanning station; second detecting means associated with said printing station for generating and furnishing to said drive means, in response to detection of a mark on a negative located at said printing station, a second signal operative to stop said drive means; and logic circuit means connected with said first and second detecting means and operative for permitting furnishing of said second signal to said drive means only if a first signal was previously generated when the same negative was located at said scanning station.

2. In a photographic printer as defined in claim 1, wherein said first and second detection means are separated along the path of the film strip a distance greater than one-half, and less than twice, the length of a negative.

3. In a photographic printer as defined in claim 2, wherein said first and second detection means are separated a distance less than the length of the shortest negative, and said logic circuit includes means for stopping said drive means when said first detection means fails to deliver a signal after the film strip has moved approximately the distance of one negative length.

4. In a photographic printer as defined in claim 2, wherein said first and second detection means are separated a distance at least equal to the length of the longest negative, and said logic circuit includes store means for storing the last signal from said first detection means.

5. In a photographic printer as defined in claim 4, wherein unprintable negatives do not have a mark and one of said scanning station and said printing station has means for storing said corrections; and wherein said logic circuit includes circuit means for preventing the printing of a negative that has no mark and for erasing the stored printing corrections for such negative.

6. In a photographic printer as defined in claim 5, wherein said logic circuit includes a start switch for operating said drive means to move the film strip past splices, leaders, and unexposed portions and for switching said logic circuit so that the latter causes said drive means to stop when said first detection means delivers a signal.

7. In a photographic printer as defined in claim 6, wherein said logic circuit further includes a density correction switch for operating said drive means and for causing the printing of a negative; brake means for stopping said drive means; coupling means for drivingly engaging said drive means when operated; a first flip-flop of which the outputs are respectively connected to said brake means and said coupling means for operating one or the other; a first OR gate of which respective inputs are connected to said density correction switch and said start switch and the output is connected to the input of said first flip-flop so that operation of each said switch operates said coupling means.

8. In a photographic printer as defined in claim 7, wherein said logic circuit further includes means for energizing said brake means, said means including first and second AND gates, each having two inputs of which one input is connected to respective ones of said first and second detection means to receive the signals thereof, and a second flip-flop of which the outputs are connected to respective ones of the other inputs of said first and second AND gates, the outputs of said first and second AND gates being connected to said first flip-flop to trigger the latter to operate said brake means.

9. In a photographic printer as defined in claim 8, including a second OR gate of which the output is connected to said first flip-flop to trigger the latter to operate said brake means, said second OR gate having two inputs respectively connected to the outputs of said first and second AND gates.

10. In a photographic printer as defined in claim 9, wherein said second flip-flop has two inputs, and further including third and fourth AND gates of which the outputs are connected to respective ones of said second flip-flop inputs, said third and fourth AND gates having each two inputs, one input of each of said third and fourth AND gates being connected to said density correction switch; a store flip-flop having two outputs connected to respective ones of the other inputs of said third and fourth AND gates, said store flip-flop having two inputs, one of which is connected to the output of said first OR gate and the other of which is connected to said first detection means to receive the signals thereof.

11. In a photographic printer as defined in claim 10, further including a third OR gate connected inputwise to said start switch and outputwise to one input of said second flip-flop so that closing of said start switch triggers said second flip-flop to that state in which a signal from said first detection means causes operation of said brake means.

12. In a photographic printer as defined in claim 11, wherein said third OR gate has two inputs, one of which is connected to said start switch and the other of which is connected to the output of said fourth AND gate.

13. In a photographic printer as defined in claim 11, wherein the output of said first AND gate controls the start of the exposure for printing at said printing station.

14. In a photographic printer as defined in claim 11, wherein the output of said fourth AND gate controls the erasing of the stored printing corrections for a negative.

* * * * *